(12) United States Patent
Griffin

(10) Patent No.: US 7,782,554 B1
(45) Date of Patent: Aug. 24, 2010

(54) TABLE AND OBJECT MAGNIFYING COMBINATION ASSEMBLY

(76) Inventor: Robin K. Griffin, 809 12th St., Marysville, CA (US) 95901

( * ) Notice: Subject to any disclaimer, the term of this patent is extended or adjusted under 35 U.S.C. 154(b) by 94 days.

(21) Appl. No.: 12/262,229

(22) Filed: Oct. 31, 2008

(51) Int. Cl.
*G02B 27/02* (2006.01)
(52) U.S. Cl. ............ 359/802; 359/804; 359/805
(58) Field of Classification Search ........ 359/801–811, 359/819, 822, 609–613; 248/291, 298, 316.5
See application file for complete search history.

(56) References Cited

U.S. PATENT DOCUMENTS

| | | | |
|---|---|---|---|
| 4,313,589 A | 2/1982 | Vega | 248/441 |
| D312,928 S | 12/1990 | Scheffers | 301/37.21 |
| 5,113,327 A | 5/1992 | Levy | 362/157 |
| 5,493,451 A | 2/1996 | Cosey, Sr. | 359/817 |
| 5,855,329 A | 1/1999 | Pagano | 248/451 |
| 6,574,051 B1 * | 6/2003 | Powell | 359/802 |
| 6,721,109 B1 * | 4/2004 | Uriarte | 359/802 |
| 6,830,356 B2 | 12/2004 | Larocque | 362/98 |
| 7,218,463 B1 * | 5/2007 | Arsenault | 359/817 |
| 2002/0051304 A1 | 5/2002 | Jung | |
| 2004/0041067 A1 | 3/2004 | Jung | |

* cited by examiner

*Primary Examiner*—Mohammed Hasan

(57) ABSTRACT

A table and object magnifying combination assembly includes a panel that has a top side, a bottom side, a front edge, a rear edge, a first lateral edge and a second lateral edge. The panel has a pair of elongated breaks therein extending between and through the front and rear edges to define an inner section positioned between the elongated breaks. The inner section is rotatably coupled to a remaining portion of the panel. The inner section has an aperture therein extending into the top side and outwardly of the bottom side so that the inner section forms a frame. A magnifying member is positioned within the aperture and is attached to the inner section. A plurality of supports is attached to and extends downwardly from the panel. Objects are viewable through the magnifying member to enlarge a view of the object.

12 Claims, 6 Drawing Sheets

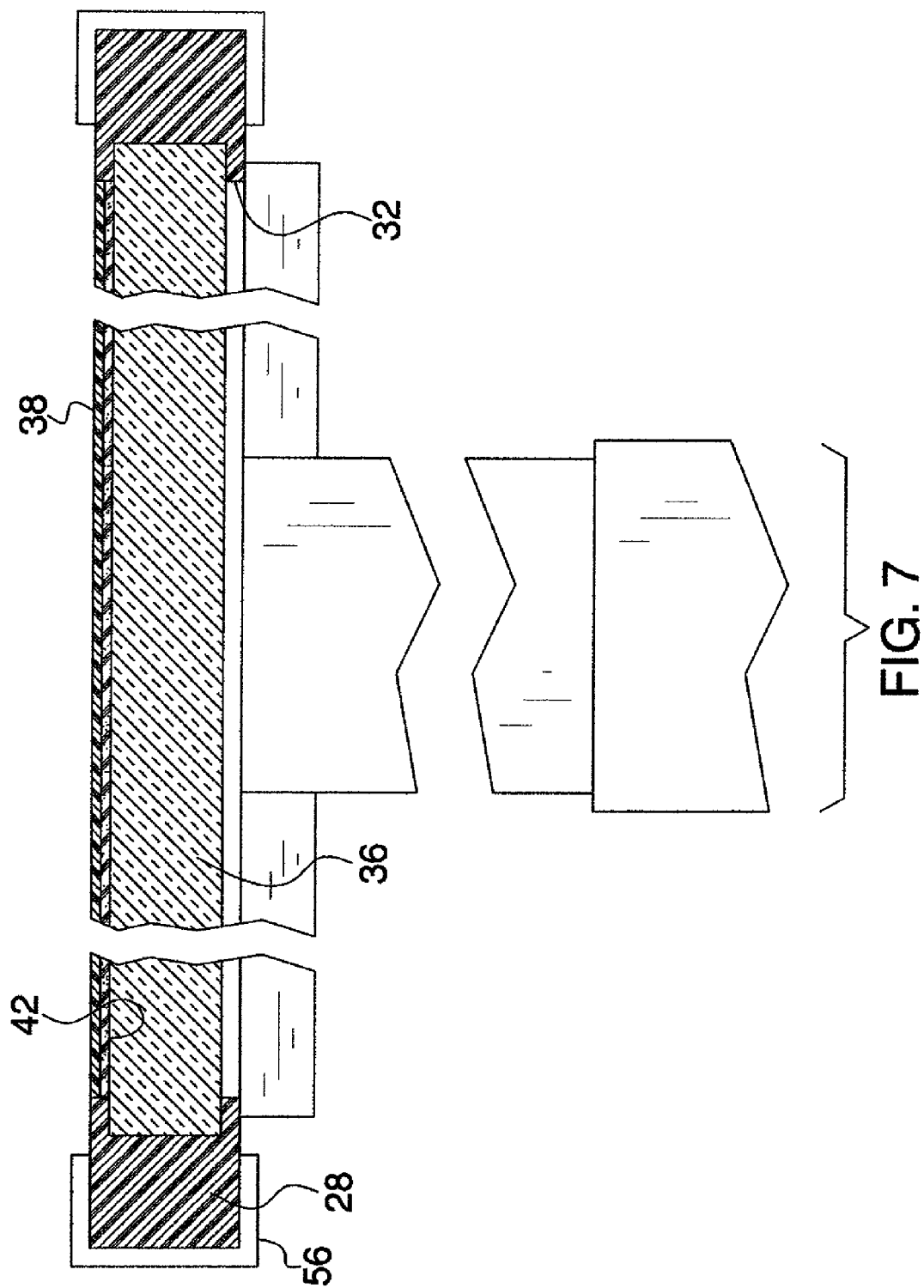

TABLE AND OBJECT MAGNIFYING COMBINATION ASSEMBLY

BACKGROUND OF THE INVENTION

Field of the Invention

The present invention relates to magnifying devices and more particularly pertains to a new magnifying device for allowing a person to easily view and magnify an object and providing a table to work upon while magnifying the object.

SUMMARY OF THE INVENTION

The present invention meets the needs presented above by generally comprising a panel that has a top side, a bottom side, a front edge, a rear edge, a first lateral edge and a second lateral edge. The panel has a pair of elongated breaks therein extending between and through the front and rear edges to define an inner section positioned between the elongated breaks. The inner section is rotatably coupled to a remaining portion of the panel. The inner section has an aperture therein extending into the top side and outwardly of the bottom side so that the inner section forms a frame. A magnifying member is positioned within the aperture and is attached to the inner section. A plurality of supports is attached to and extends downwardly from the panel. Objects are viewable through the magnifying member to enlarge a view of the object.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a cross-sectional view taken along line 7-7 of FIG. 3 of the present invention.

DESCRIPTION OF THE PREFERRED EMBODIMENT

Figure 1:
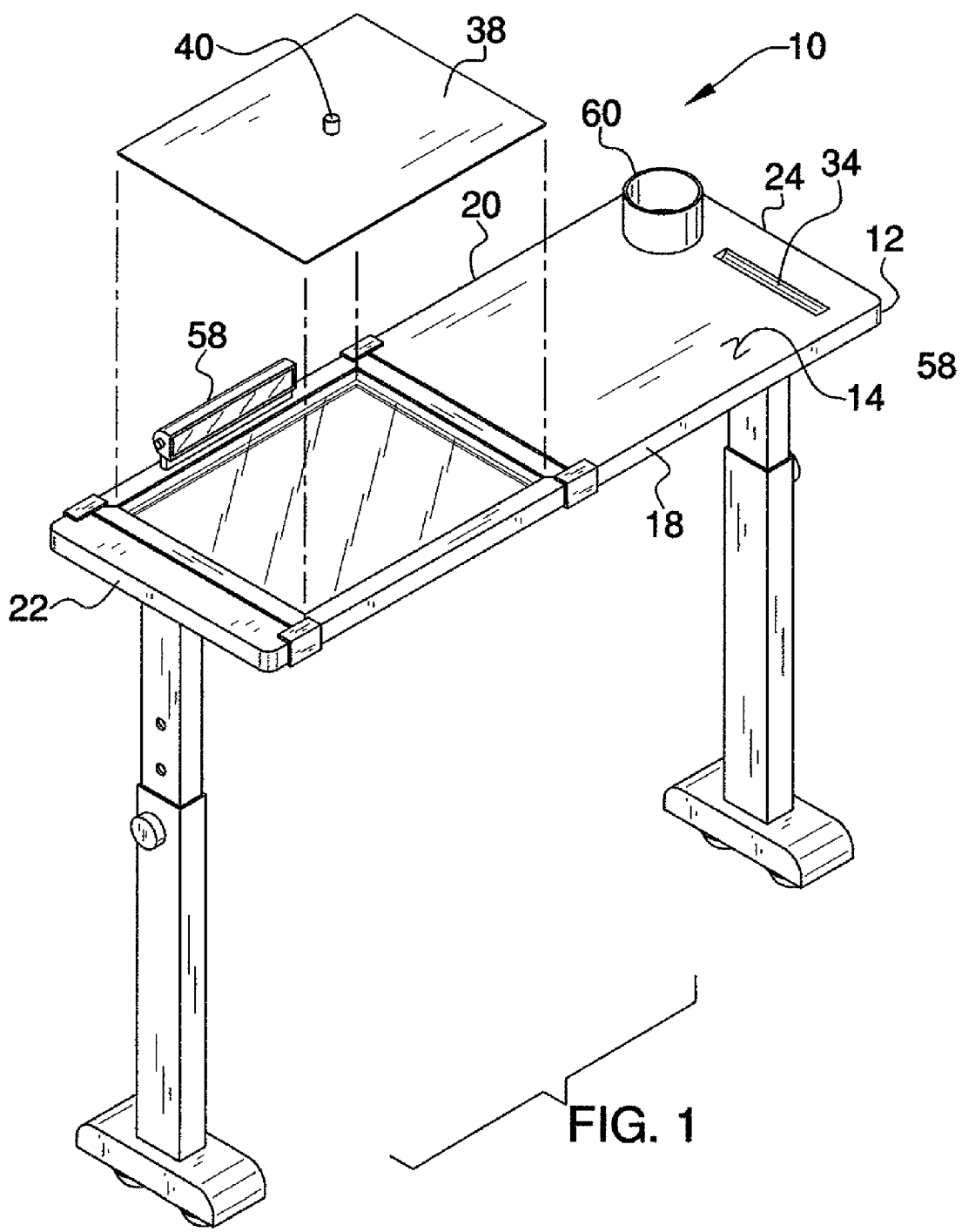
FIG. 1 is a top perspective view of a table and object magnifying combination assembly according to the present invention.
Figure 2:
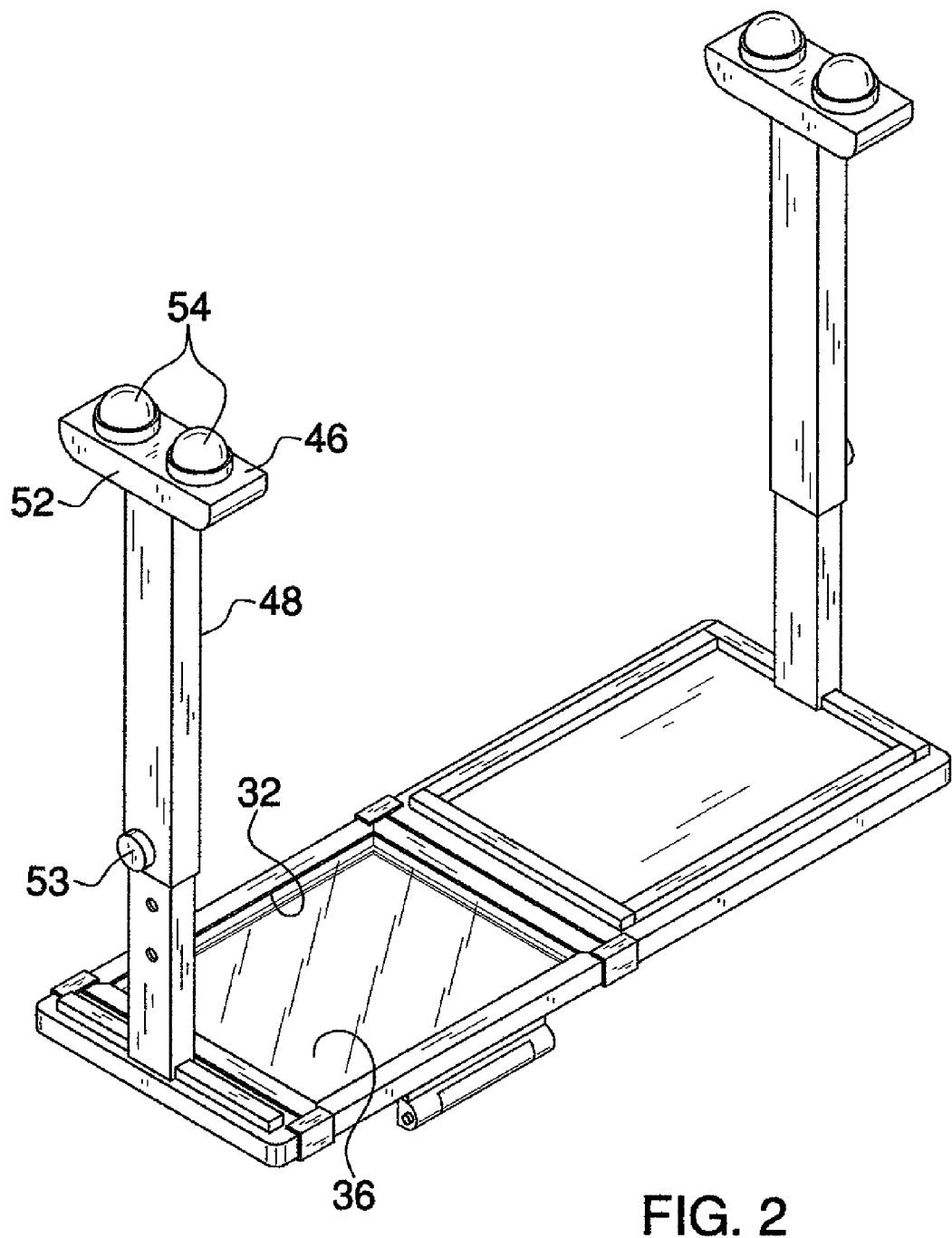
FIG. 2 is a bottom perspective view of the present invention.
Figure 3:
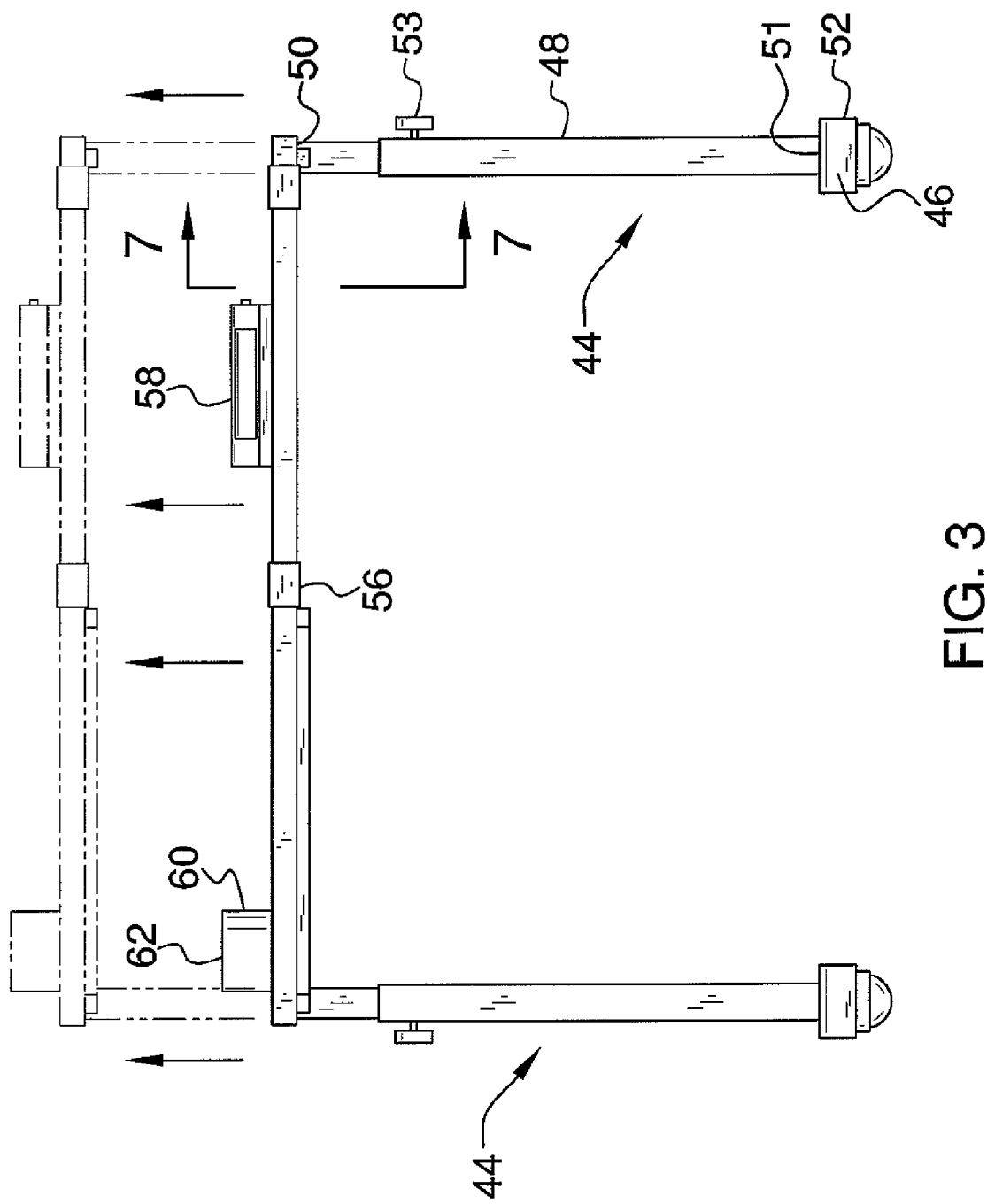
FIG. 3 is a rear view of the present invention.
Figure 4:
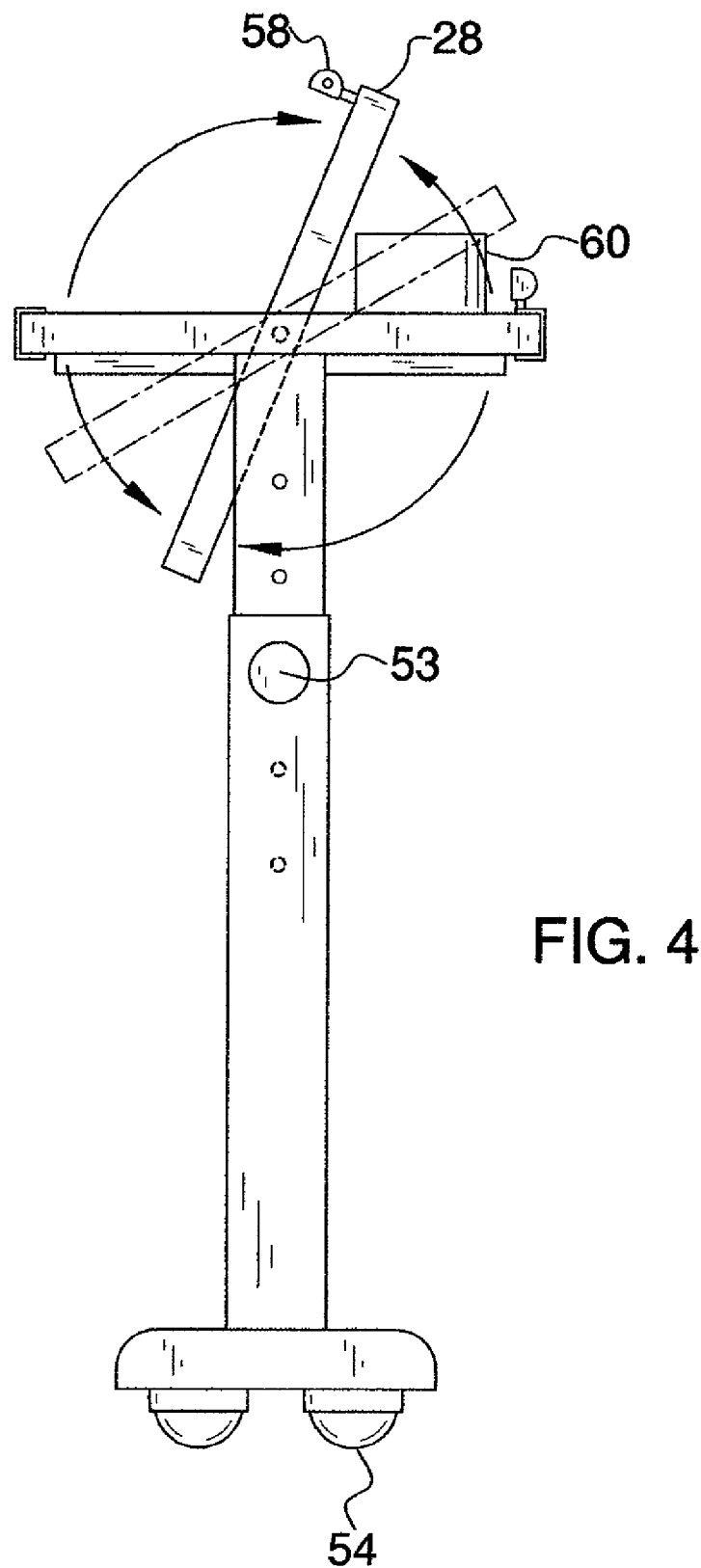
FIG. 4 is a side view of the present invention.
Figure 5:
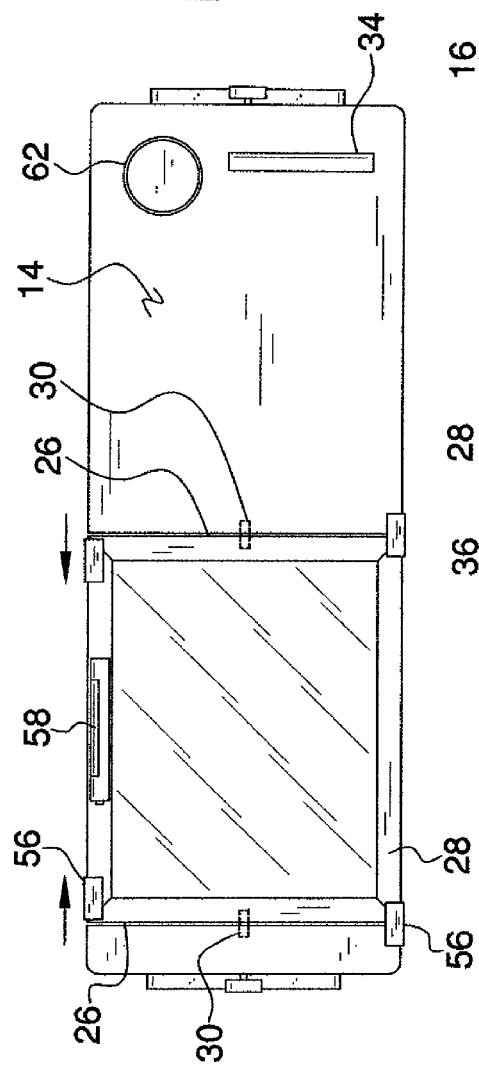
FIG. 5 is a top view of the present invention.
Figure 6:
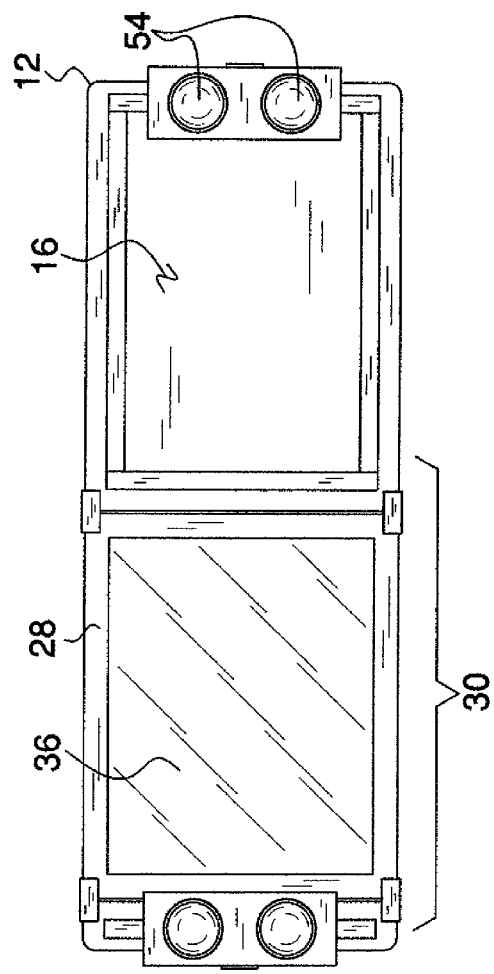
FIG. 6 is a bottom view of the present invention.

With reference now to the drawings, and in particular to FIGS. 1 through 7 thereof, a new magnifying device embodying the principles and concepts of the present invention and generally designated by the reference numeral 10 will be described.

As best illustrated in FIGS. 1 through 7, the table and object magnifying combination assembly 10 generally comprises a panel 12 that has a top side 14, a bottom side 16, a front edge 18, a rear edge 20, a first lateral edge 22 and a second lateral edge 24. The panel 12 has a pair of elongated breaks 26 therein extending between and through the front 18 and rear 20 edges to define an inner section 28 positioned between the elongated breaks 26. The inner section 28 is rotatably coupled to a remaining, non-rotatable portion of the panel 12 by a pair of pivot rods 30. The inner section 28 has an aperture 32 therein extending into the top side 14 and outwardly of the bottom side 16 so that the inner section 28 forms a frame. The inner section 28 is positioned nearer to the first lateral edge 22 than the second lateral edge 24. The top side 14 has an elongated trough 30 therein. The elongated trough 34 is positioned adjacent to the second lateral edge 24 and can hold writing utensils and the like.

A magnifying member 36 is positioned within the aperture 32 and is attached to the inner section 28. The magnifying member 36 is a conventional magnifying glass consisting of a glass material or a plastic material. A plate 38 has a size and shape of the aperture 32 is removably positioned on the magnifying member 36 to cover the magnifying member 36. A grip 40 is attached to the plate. The plate 38 covers and protects the magnifying member 36 when it is not being used to magnify objects and so that objects may be positioned on the inner section 28. A cushioning member 42 may be attached to the plate 38 to prevent the plate 38 from damaging the magnifying member 36. The cushioning member 42 may include a resiliently compressible material such as a foamed elastomeric material.

A plurality of supports 44 is attached to and extends downwardly from the panel 12. Each of the supports 44 has a bottom end 46 and each of the supports 44 is telescopic to have a selectively adjustable height. The inner section 28 is free of any of the supports 44. In particular, the supports 44 may each include a telescopic leg 48 having a top end 50 attached to the panel 12 and a lower end 51 attached to an elongated base 52, which forms the bottom end 46, to provide more stability to the panel. Locking pins 53 are used to lock the legs 48 at a selected height. The plurality of supports 44 includes two supports. A plurality of rolling members 54, such as wheels or castors, is provided. Each of the bottom ends 46 has at least one of the rolling members 54 attached thereto to allow the supports 44 to be rolled across a floor surface.

At least one locking member 56 is positioned on the panel 12 and releasably engages the inner section 28 with a non-rotatable portion 30 of the panel 12 to releasably retain the inner section 28 in a fixed and co-planar relationship with the non-rotatable portion 30 of the panel 12. This will allow the inner section 28 to be used as part of a tabletop as well as prevent objects positioned on the inner section 28 from falling off of the inner section 28 or causing the inner section 28 to rotate due to their weight. The locking member 56 may include a plurality of sliding clips that are slid over the breaks 26 and onto a juncture of the non-rotatable portion 30 and the inner section 28 to prevent the inner section 28 from rotating relative to the non-rotatable portion 30 of the panel 12.

A light emitter 58 is mounted on the panel 12. The light emitter 58 is positioned on the inner section 28 and is directed toward the aperture 32. The light emitter 58 illuminates objects being magnified by the magnifying member 36.

A container 60 is securely attached to the panel 12 and extends upwardly therefrom. The container 60 has and upper edge 62 defining an access opening into the container 60. The container 60 is spaced from the inner section 28 and can be used for holding writing utensils or devices used to manipulate objects being viewed through the magnifying member 36.

In use, objects are viewable through the magnifying member 36 to enlarge a view of the object. The assembly 10 can be rolled where needed to allow it to be positioned over a table while the assembly 10 itself can be used as a table.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A table and object magnifying combination assembly, said assembly including:
   a panel having a top side, a bottom side, a front edge, a rear edge, a first lateral edge and a second lateral edge, said panel having a pair of elongated breaks therein extending between and through said front and rear edges to define an inner section positioned between said elongated breaks, said inner section being rotatably coupled to a remaining portion of said panel, said inner section having an aperture therein extending into said top side and outwardly of said bottom side so that said inner section forms a frame;
   a magnifying member being positioned within said aperture and being attached to said inner section;
   a plurality of supports being attached to and extending downwardly from said panel; and
   wherein objects are viewable through said magnifying member to enlarge a view of the object.

2. The assembly according to claim 1, wherein each of said supports is telescopic and has a selectively adjustable height.

3. The assembly according to claim 1, wherein said inner section is free of any of said supports.

4. The assembly according to claim 1, further including a plurality of rolling members, each of said bottom ends having at least one of said rolling members attached thereto to allow said supports to be rolled across a floor surface.

5. The assembly according to claim 1, further including at least one locking member being positioned on said panel and releasably engaging said inner section with a non-rotatable portion of said panel to releasably retain said inner section in a fixed and co-planar relationship with said non-rotatable portion of said panel.

6. The assembly according to claim 5, further including a plate having a size and shape of said aperture being removably positioned on said magnifying member to cover said magnifying member, a grip being attached to said plate.

7. The assembly according to claim 1, further including a plate having a size and shape of said aperture being removably positioned on said magnifying member to cover said magnifying member, a grip being attached to said plate.

8. The assembly according to claim 1, further including a light emitter being mounted on said panel.

9. The assembly according to claim 8, wherein said light emitter is positioned on said inner section and being directed toward said aperture.

10. The assembly according to claim 1, further including a container being securely attached to said panel and extending upwardly therefrom, said container having and upper edge defining an access opening into said container, said container being spaced from said inner section.

11. The assembly according to claim 1, wherein said top side having an elongated trough therein.

12. A table and object magnifying combination assembly, said assembly including:
   a panel having a top side, a bottom side, a front edge, a rear edge, a first lateral edge and a second lateral edge, said panel having a pair of elongated breaks therein extending between and through said front and rear edges to define an inner section positioned between said elongated breaks, said inner section being rotatably coupled to a remaining portion of said panel, said inner section having an aperture therein extending into said top side and outwardly of said bottom side so that said inner section forms a frame, said inner section being positioned nearer to said first lateral edge than said second lateral edge;
   a magnifying member being positioned within said aperture and being attached to said inner section, said magnifying member consisting of a glass material or a plastic material;
   a plurality of supports being attached to and extending downwardly from said panel, each of said supports having a bottom end, each of said supports being telescopic and having a selectively adjustable height, said inner section being free of any of said supports;
   a plurality of rolling members, each of said bottom ends having at least one of said rolling members attached thereto to allow said supports to be rolled across a floor surface;
   at least one locking member being positioned on said panel and releasably engaging said inner section with a non-rotatable portion of said panel to releasably retain said inner section in a fixed and co-planar relationship with said non-rotatable portion of said panel;
   a plate having a size and shape of said aperture being removably positioned on said magnifying member to cover said magnifying member, a grip being attached to said plate;
   a light emitter being mounted on said panel, said light emitter being positioned on said inner section and being directed toward said aperture;
   a container being securely attached to said panel and extending upwardly therefrom, said container having and upper edge defining an access opening into said container, said container being spaced from said inner section;
   said top side having an elongated trough therein, said elongated trough being positioned adjacent to said second lateral edge; and
   wherein objects are viewable through said magnifying member to enlarge a view of the object.

* * * * *